(12) United States Patent
Buckley et al.

(10) Patent No.: US 10,594,237 B2
(45) Date of Patent: Mar. 17, 2020

(54) CONVERGED MOTOR DRIVE CONTROL FOR BRUSHLESS DC MOTOR

(71) Applicant: Texas Instruments Incorporated, Dallas, TX (US)

(72) Inventors: Zachery S. Buckley, Richardson, TX (US); Seil Oh, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 193 days.

(21) Appl. No.: 15/299,029

(22) Filed: Oct. 20, 2016

(65) Prior Publication Data
US 2018/0115263 A1 Apr. 26, 2018

(51) Int. Cl.
*H02P 6/18* (2016.01)
*H02P 6/182* (2016.01)
*H02P 6/15* (2016.01)
*H02P 6/17* (2016.01)

(52) U.S. Cl.
CPC .............. *H02P 6/182* (2013.01); *H02P 6/153* (2016.02); *H02P 6/17* (2016.02)

(58) Field of Classification Search
CPC .................................. H02P 6/18; H02P 27/08
USPC ..................................................... 318/400.34
See application file for complete search history.

(56) References Cited

U.S. PATENT DOCUMENTS

| 6,034,493 A * | 3/2000 | Boyd ...................... H02P 6/182 318/400.31 |
| 7,276,877 B2 | 10/2007 | Qiu et al. |
| 9,729,099 B1 * | 8/2017 | Lovas ...................... H02P 23/14 |
| 2003/0231875 A1 * | 12/2003 | Masino ...................... H02P 6/12 388/800 |
| 2006/0186846 A1 * | 8/2006 | Lassen ...................... H02P 6/182 318/400.21 |
| 2006/0279242 A1 * | 12/2006 | Lindemann ............ H02P 6/182 318/400.35 |
| 2010/0066287 A1 * | 3/2010 | Street ....................... H02P 6/18 318/400.34 |

OTHER PUBLICATIONS

Designer Reference Manual, Motorola, Freescale Semiconductor, Inc.; Digital DNA, 3-Phase Sensorless BLDC Motor Control with Back-EMF Zero Crossing Detection Using 56F805, Revised Mar. 2003, 190 pgs.

(Continued)

*Primary Examiner* — Eduardo Colon Santana
*Assistant Examiner* — Gabriel Agared
(74) *Attorney, Agent, or Firm* — Lawrence J. Bassuk; Charles A. Brill; Frank D. Cimino

(57) ABSTRACT

A system includes a timer to determine a time interval between successive commutation state changes of a brushless direct current (BLDC) motor. A speed calculator computes a speed of the BLDC motor based on the time interval. A threshold calculator determines a threshold based on the computed speed, the threshold specifying a calculation of back electromotive force (BEMF) and mutual inductance of the BLDC motor at a next state change of the BLDC motor. A state change trigger commands the next state change based on a measured voltage associated with a floating phase of the BLDC motor relative to the threshold.

19 Claims, 2 Drawing Sheets

(56) References Cited

OTHER PUBLICATIONS

STMicroelectronics, AN1946 Application Note, Sensorless Bldg Motor Control and BEMF Sampling Methods With ST7MC; Copyright 2007, www.st.com; 35 pgs.

Bilal Akin and Manish Bhardwaj, Application Report, SPRABQ7A - Sensorless Trapezoidal Control of BLDG Motors, Revised Sep. 2015, 41 pgs.

Bhargavi Nisarga and Daniel Torres, Application Report, Sensored 3-Phase BLDC Motor Control Using MSP430, Manual, Jul. 2011, 20 pgs.

Jose Carlos Gamazo-Real, Ernesto Vazquez-Sanchez and Jaime Gomez-Gil, Open Access Sensors, Position and Speed Control of Brushless DC Motors Using Sensorless Techniques and Application Trends, ISSN 1424-8220, Publication, www.mdpi.com/journal/sensors, Jul. 19, 2010, 47 pgs.

* cited by examiner

CONVERGED MOTOR DRIVE CONTROL FOR BRUSHLESS DC MOTOR

TECHNICAL FIELD

This disclosure relates to converged motor drive control for brushless dc motor.

BACKGROUND

A brushless direct current (BLDC) motor is an AC synchronous motor with permanent magnets on the rotor and windings on the stator. BLDC motors have gained popularity in recent years, including for devices such as computer hard disk drives, CD and DVD players, pumps, cooling fans and power tools.

Permanent magnets create the rotor flux and the energized stator windings create electromagnet poles, which when energized results in rotation of the rotor. Motor commutation in BLDC motors is implemented by an electronic controller and, to determine the rotor position and to know when to commutate, may implement either sensor-based control (e.g., by Hall sensors) or sensorless control (e.g., via the back EMF generated in the stator windings).

SUMMARY

This disclosure relates to converged motor drive control for brushless dc motor.

In one example, a system includes a timer to determine a time interval between successive commutation state changes of a brushless direct current (BLDC) motor. A speed calculator computes a speed of the BLDC motor based on the time interval. A threshold calculator determines a threshold based on the computed speed, the threshold specifying a calculation of back electromotive force (BEMF) and mutual inductance of the BLDC motor at a next state change of the BLDC motor. A state change trigger commands the next state change based on a measured voltage associated with a floating phase of the BLDC motor relative to the threshold.

In another example, a BLDC motor system includes a motor controller to control operation of the BLDC motor. The motor controller includes a drive state control that provides a variable commutation voltage threshold that varies based on a speed of the BLDC motor to specify back electromotive force (BEMF) and mutual inductance for a floating phase of the BLDC motor at a next state change of the BLDC motor. The drive state control generates a trigger to command the next state change based on a comparison of a measured voltage for the floating phase of the BLDC motor relative to the threshold. The motor controller also includes a driver control to control current supplied to phases of the BLDC motor current based on the state change trigger.

In yet another example, a method includes detecting commutation state change for a BLDC motor. The method also includes calculating speed of the BLDC motor based on a time interval between successive commutation state changes of the BLDC motor. The method also includes calculating a variable commutation state change threshold based on the computed speed, the threshold representing an electromotive force (BEMF) and a mutual inductance for a floating phase of the BLDC motor at a next commutation state change. The method also includes comparing the threshold to a measured voltage for the floating phase of the BLDC motor to determine the next commutation state change.

DETAILED DESCRIPTION

This disclosure provides converged motor drive control for commutation state changes of brushless DC (BLDC) motors. The converged control scheme determines a variable commutation threshold voltage that changes based on speed of the BLDC motor. The speed can be computed based on a time interval between successive commutation state changes. The commutation threshold is determined to represent an expected phase voltage that a floating phase of the BLDC motor will have at a next commutation point (commutation state change). For example, a threshold calculator computes the commutation threshold to reflect both the mutual inductance and back electromotive force (BEMF) of the floating phase when the motor reaches the next commutation point. The threshold calculator may utilize motor parameters associated with a given BLDC motor, such as may be derived for from empirical studies and/or from models acquired for the given motor configuration. In this way, the commutation threshold can be computed during operation as to vary across a speed spectrum that is supported by the BLDC motor.

The mutual inductance and BEMF voltages that determine a variable commutation threshold enable consistent commutation state changes to result in smooth control across an entire operating range of the motor. Since the commutation threshold changes as a function of motor speed, motor controls can achieve better speed torque performance (e.g., reduced torque ripple) and improved efficiency at low and intermediate speeds than other sensorless approaches. The sensorless control scheme disclosed herein can further help reduce the cost and complexity of the resulting motor control system by eliminating all of the sensors (e.g., Hall-effect position sensors) and associated wiring harnesses used in sensor based controls.

Figure 1:
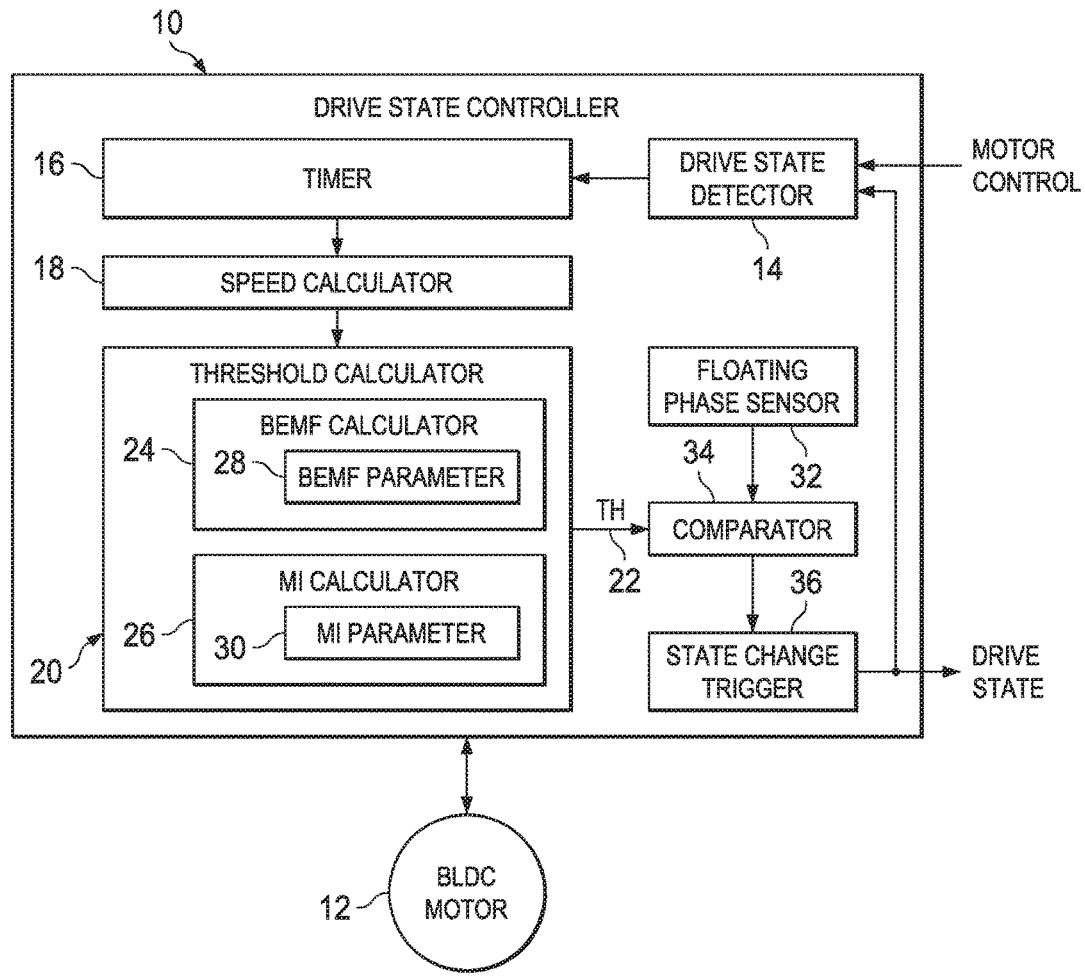
FIG. 1 depicts an example of a drive state control system.

FIG. 1 depicts an example of a drive state controller 10 that is configured to determine a commutation state change for a brushless DC motor 12. The drive state controller 10 provides a sensorless approach to control commutation state changes of the brushless DC motor 12. A motor controller utilizes the current commutation state and drive state change to control current that is provided to the phases of the BLDC motor 12. Unlike existing approaches that may switch from mutual inductance based control to BEMF control at a set switch point, the drive state controller 10 implements a sensorless based control that converges mutual inductance and BEMF controls across the operating range of speeds. The converged drive state control scheme provides for seamlessly, gradually transitioning between mutual inductance and BEMF based control as a function of motor speed. For example, many BLDC motor applications are variable speed (e.g., power tools, cooling fans, or the like) and thus transition back and forth between low and high speeds. Such speed changes can result from user control or from varying load condition when they occur. Thus the drive state controller 10 may determine state changes that enable improved smooth motor control across a wide range of motor operating speeds for these and other BLDC motor applications.

The drive state controller 10 may determine motor speed by tracking the time interval between successive state changes, which represents a part of the mechanical cycle of the motor. In a 3-phase BLDC motor control, for example, the electrical angle measured between successive state changes can be translated to a respective mechanical angle. For example, for a 4-pole 3-phase BLDC motor, one mechanical revolution is equal to two electrical cycles; for an 8-pole 3-phase BLDC motor, one mechanical revolution is equal to four electrical cycles.

As shown in the example of FIG. 1, the drive state controller 10 includes a drive state detector 14. The drive state detector 14 provides a signal to indicate a change in the commutation state of the BLDC motor 12. The drive state detector 14 can detect changes in commutation state based on monitoring the output of the drive state controller 10, which is used to trigger subsequent commutation state changes. Alternatively or additionally, the drive state detector 14 can detect changes in commutation state by monitoring drive controls of a motor drive controller. For example, the drive controls may implement a commutation state counter that is used as an input to indicate a current commutation state to pulse width modulation (PWM) control to appropriate phase windings of the motor 12.

In the example of FIG. 1, the drive state controller 10 also includes a timer 16 to receive the drive state change detection signal and compute an elapsed time between successive commutation state changes. For example, the timer 16 can include or receive an input clock signal or other time base to determine an elapsed time interval between successive commutation state changes. For example, the timer 16 can reset the counter in response to the drive state detector 14 indicating a commutation state change. The counter 16 can increment based on the clock signal until the next successive commutation state change is indicated by the drive state detector 14. Alternatively, the timer may use a running a time value and determine the elapsed time as the difference between time values recorded at successive state changes.

The elapsed time between commutation state changes can be provided to a speed calculator 18. Since commutation state changes according to motor position (e.g., relative position between the rotor and stator of the motor 12), the speed calculator 18 can compute an indication of speed for the BLDC motor 12 based on the time interval provided by the timer 16, which corresponds to predetermined number of electrical (and mechanical) degrees depending on the motor configuration. Thus the speed calculator 18 computes motor speed at each detected state change to provide a corresponding speed value (e.g., in degrees per second).

The motor speed is provided to a threshold calculator 20 to compute the commutation state threshold 22 for a next commutation state. The threshold calculator 20 determines the threshold based on the computed speed from the speed calculator 18. The threshold calculator 20 determines the threshold 22 to specify a voltage that a floating motor phase will have at a next state change of the BLDC motor. The threshold 22 represents an expected calculation of BEMF voltage and mutual inductance voltage of the BLDC motor 12 at the next state change. That is, at a given state change (e.g., detected by drive state detector 14), the position of the motor is known such as in electrical degrees according to the configuration of the motor 12. Since the position of the motor is known at each respective state change, as the motor continues rotating in the same direction, the next commutation state change can be determined as a predetermined electrical angle from its current position at the detected state change. For the example of a three phase BLDC motor, the next commutation state will be approximately 60 degrees (electrical angle) ahead of the previous state change. Since the electrical characteristics of the motor, including mutual inductance and BEMF are predictable based upon speed and position, the threshold calculator 20 can computes an aggregate voltage across the floating phase at the next commutation point where the state change is to occur.

By way of example, the threshold calculator 20 includes a BEMF calculator 24 and a mutual inductance (MI) calculator 26. The BEMF calculator 24 uses one or more predetermined BEMF parameters specifying how BEMF varies as a function of motor speed. As an example, a BEMF parameter such as $K_e$ dictates the amount of BEMF for a given motor at a particular speed. This predetermined BEMF parameter can be obtained by manually spinning the motor and measuring the generated voltage across two phases and recording the electrical speed at which the voltage was measured. The BEMF calculator 24 thus can apply the computed speed to the BEMF parameter 28 and compute an estimation of the BEMF at the motor position corresponding to the next commutation state change.

Similarly, since mutual inductance of the floating phase varies as a function of the change in current for the energized phase windings, the determined position of the motor associated with the next commutation point for the BLDC motor 12 thus can be used to determine a mutual inductance parameter 30 for the BLDC motor indication that can be applied to motor position to determine the mutual inductance for the floating phase for each motor position, including each commutation point. For example, the mutual inductance calculator 26 can apply the mutual inductance parameter 30 that has been predetermined for the BLDC motor 12 to the determined next commutation point and thereby ascertain the contribution of the mutual inductance to the floating phase voltage at the next state change.

The threshold calculator 20 combines the BEMF and the mutual inductance contribution of the voltage for the floating phase at the next state change to provide the corresponding commutation threshold for the next state change of the BLDC motor. In practice, for example, at zero and low speeds when there is no BEMF, the threshold 22 may uses the mutual inductance data. As the speed increases, rather than transitioning to a different commutation method, as in some mutual inductance based drives, the threshold calculator 20 merges relative contributions from both BEMF and mutual inductance voltages into computing the commutation state change threshold 22. In this way, the commutation threshold 22 varies continuously based on the speed of the motor, which results in seamlessly transitioning between BEMF and mutual inductance as the speed of the motor 12 changes.

The drive state controller 10 can also include a floating phase sensor 32 that receives an input representing the sensed voltage of the floating phase. As one example, the floating phase voltage can be measured across a floating phase between an input to the phase center tap node of a Y-connected multiphase BLDC motor 12 and the phase winding of the floating phase. Alternatively, the floating phase voltage can be measured across a floating phase winding of the floating phase and the system ground. The floating phase may be sensed at different location for different motor configurations. Since the floating phase will change during operation depending on the commutation state, the floating phase sensor 32 further can select the phase voltage based upon the current commutation state of the motor 12.

In addition to providing an indication of the measured floating phase voltage, floating phase sensor 32 can also provide the threshold calculator 20 with an indication of whether the floating phase is increasing or decreasing. For example, the indication of whether the floating phase is increasing or decreasing may be determined based on the commutation state. That is each commutation state may be known to provide an increasing or decreasing floating phase according to the direction of current flow through the phase windings. Alternatively or additionally, the indication of whether the floating phase is increasing or decreasing may be calculated, such as by taking the derivative of the measured floating phase voltage. The threshold calculator 20 further may adjust the commutation threshold 22 (e.g., by implementing a sign change—a negation—in the calculation) based on whether the floating phase voltage is increasing or decreasing for a given drive state. This negation of the calculation can be used to drive the motor in the opposite direction of rotation. For example, when the motor is spinning in a given direction, the floating phase voltage will be either increasing or decreasing for a given drive state. If this same motor's direction is reversed, for the same given drive state, the floating phase should be moving in the opposite direction, that is decreasing or increasing, respectively.

The drive state controller 10 also may include a comparator 34 to compare the commutation threshold 22 with the floating phase voltage from sensor 32. When the floating phase voltage satisfies (e.g., crosses) the threshold, the comparator 34 may provide its comparator output to a state change trigger 36. The state change trigger 36 may provide a trigger signal to command a commutation state change. Thus, the drive state controller 10 can effectively determine and trigger commutation state changes as part of the motor control loop to provide efficient and smooth control across a range of operating speeds.

The drive state controller 10 may be implemented as hardware, software or firmware (e.g., machine readable instructions executable by a processor) or as a combination of hardware and software. As a further example, the drive state controller 10 may be implemented as part of a motor controller, which may be embodied in a single integrated circuit (IC) chip or an arrangement of multiple IC chips. For example, the drive state controller 10 may be implemented as instructions stored in a programmable core operating as an internal loop to the motor control functions to trigger commutation state changes for a given BLDC motor, as disclosed herein.

Figure 2:
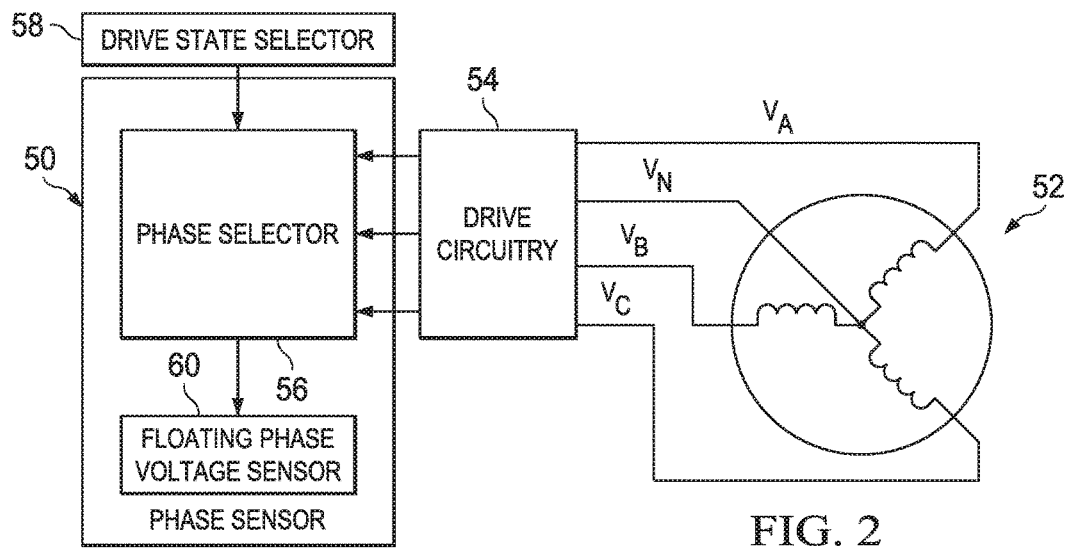
FIG. 2 depicts an example of phase sensing that can be used by a drive state controller.

FIG. 2 depicts an example of a floating phase sensor 50 such as corresponding to floating phase sensor 32 demonstrated in FIG. 1. Thus reference may be made back to FIG. 1 for additional context in which the floating phase sensor 50 may operate. In the example of FIG. 2, the phase sensor 50 is coupled to motor drive circuitry 54 that is connected to selectively supply drive current to phases of the BLDC motor 52. For example, the drive circuitry 54 can be connected to phase windings of a three phase BLDC motor 52. As mentioned, the drive state controls disclosed herein are equally applicable to BLDC motors having any number of one or more phases, and the drive circuitry can be connected to drive each of the phases according to the motor configuration The drive circuitry 54 thus can supply a measure of phase voltages across each of the windings, such as measured as a line to neutral voltage for each phase or measured as a line to system ground for each phase. In the example of FIG. 2, drive circuitry 54 supplies the phase voltages to a phase selector 56. The phase selector 56 selectively supplies an indication of a measured phase voltage for the floating phase of the motor 52. The phase selector may supply the floating phase voltage by selecting one of the measured phase voltages based on the detected commutation state and providing the selected phase voltage to a phase voltage sensor 60. For example, phase sensor 50 may receive an indication of the present commutation state from a drive state detector 58. The drive state detector 58 can correspond to drive state detector 14 of FIG. 1 or otherwise may be ascertained from motor control (e.g., a commutation state counter in the motor controller). The phase selector thus may perform a multiplexing function to supply the selected phase voltage, corresponding to the floating phase according to the detected commutation state, to the floating phase voltage sensor 60 to indicate the measure of floating phase voltage that is to be compared (e.g., by the comparator 34) with the variable commutation threshold.

Figure 3:
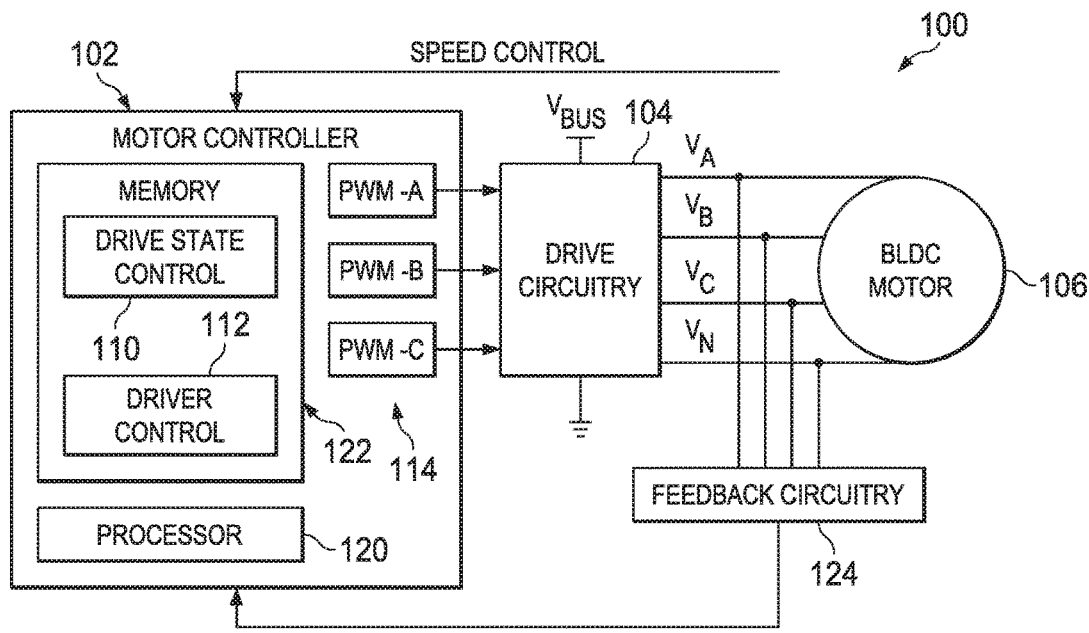
FIG. 3 depicts an example of a motor system implementing a drive state controller.

FIG. 3 is an example of a motor system 100 that includes a motor controller 102 configured to control operation of a BLDC motor 106. For instance, the motor controller supplies control signals to drive circuitry 104 that supplies current to a respective phase of a BLDC motor 106 such as based on a commutation state determined by the motor controller 102. In the example of FIG. 3, the motor controller includes a drive state control 110 and driver control 112. The drive state controller 110 can be configured as the drive state controller 10 of FIG. 1, and thus reference may be made back to FIG. 1 or the method of FIG. 4, for additional information about determining commutation state changes.

The driver control 112 is configured to control the PWM modules 114 demonstrated as PWM-A, PWM-B, and PWM-C. Each of the PWM output modules 114 supplies PWM signals to associated drive circuitry 104. The drive circuitry 104 may include a power inverter circuit that is connected between a voltage bus ($V_{BUS}$) and electrical ground. The driver control 112 and PWM control signals from modules 114 thus commutate the motor based on the current commutation state commanded by drive state control 110 and a speed control input to the motor controller. For example a speed control input can be provided (e.g., from a host device), such as in response to a user input or detecting load conditions associated with the BLDC motor 106.

In the example of FIG. 3, the motor controller 102 includes a processor 120 and memory 122. The processor 120 accesses the memory 122 to execute instructions. In this example, the instructions include the drive state control 110 and driver control 112. In other examples, the motor controller 102 can be implemented as other types of hardware, including the field programmable gate array (FPGA) or as other hardware such as a combination of digital logic, and discrete components arranged together to perform the functions disclosed herein. In some examples, the motor controller 102 may be implemented as an IC chip that includes pins to provide PWM output signals to the drive circuitry 104 and other pins to receive inputs, such as including signals from the feedback circuitry and the speed control input. The IC further may employ interfaces with analog-to-digital converters to convert the input signals to digital form for processing.

Also demonstrated in the example of FIG. 3, the motor system 100 includes feedback circuitry 124 connected to the respective phase inputs and center tap ($V_N$). The feedback circuitry 124 provides a feedback signal to the motor controller 102. For example, the feedback circuitry 124 includes an arrangement of sensing circuits (e.g., current and/or voltage sensing circuits) connected to provide one or more feedback signals. The feedback signals may include an indication of phase voltage across each of the respective phases.

For example, feedback circuitry 124 can include a set of sensors connected to an input of each phase winding and the center tap voltage $V_N$. The feedback circuitry 124 thus can supply phase voltages as feedback to the motor controller 102. The drive state control 110 can employ a phase sensor (e.g., phase sensor 50 or 32) to provide a measure of phase voltage for the floating phase of the BLDC motor 106. As disclosed herein, the phase voltage can be selected for the floating phase based upon the current commutation state (e.g., determined by the drive state detector 14, 58). The drive state controller 110 thus calculates a variable commutation state change threshold that can be compared to the measured floating phase voltage, which is received via feedback circuitry 124, to determine when to trigger a next state change for the motor system 100. The driver control 112 thus can employ the commutation state change trigger, which is detected in response to comparing the measured floating phase voltage to the computed state change threshold as part of its motor control loop, and in turn set the commutation state. The driver control 112 thus controls the PWM modules 114 based on the commutation state, speed control and other inputs to operate the motor 106. For instance, the driver control may adjust the duty cycle of each of the PWM signals to energize phase windings as a function of the speed control signal and the commutation state control signal during normal operation.

Additionally, at start up, the motor controller 102 may utilize the driver control 112 and/or other internal functions to determine a starting position based on motor inductance, for example. The starting position can be used by the driver control 112 to set an initial commutation state and to enable starting the BLDC motor 106 from zero speed and, as speed increases, gradually transition into BEMF detection seamlessly while in closed loop control. For example, associated logic or circuitry of the drive control (e.g., a counter) 112 can determine an initial starting state and step through commutation states responsive to state changes triggered by the drive state control 110.

By way of further example, based on motor inductance (e.g., self-inductance or mutual inductance), the position of the motor can be known from a standstill condition. When the motor begins to spin, the motor's inductance property varies with position. The feedback circuitry 124 may provide a voltage measured for a floating phase while the other two phases of the motor 106 are being driven by the drive circuitry injecting current to provide an indication of the motor inductance. For instance, the feedback circuitry 124 can provide the floating phase voltage to the motor controller 102 while the motor is stationary, in response to driver control 112 causing injection of a small current (e.g., insufficient to drive the motor to rotate) through the other phase windings. A phase sensor (e.g., sensor 32 or 50) of drive state controller 110 thus can measure the floating phase voltage responsive to the non-motive current, which enables the motor controller 102 to determine position known from zero speed (e.g., stationary or starting position).

The drive state control 110 and driver control 112, in turn, use the starting position to select an initial commutation state for commutating the motor 106. Once rotating, the motor controller 102 utilizes the drive state controller 110 to trigger subsequent commutation state changes, such as disclosed herein, and the driver control 112 can control PWM output modules 114 to supply current from drive circuitry 104 to phase windings of the motor according to the speed control and the commutation state. Controlling the motor at very low speeds in closed loop control affords better startup performance and low speed control than other sensorless drive controls.

As a further example, assuming trapezoidal control for a three-phase BLDC motor 106, the driver control 112 can assume one of the six possible values that indicate the current commutation state. The commutation state changes from one state to the next in response to the drive state control 110 applying a state change trigger (e.g., a pulse) signal based on the floating phase satisfying the state change threshold. The drive controls uses the commutation state values to control operation of the PWM control modules the six commutation states of the drive circuitry (e.g., a power inverter) 104 for driving the BLDC motor 106. The duty cycle generated by each of the activated PWM control modules (according to the six commutation states) during the motor speed up routine are determined by control inputs to the motor controller 102. For example, each of the PWM controller supplies PWM signals to appropriate pairs of transistor devices (e.g., power field effect transistors) of the drive circuitry 104 to control the 3-phase motor commutation. The duty cycle of the PWM signals is used to control the current through the motor windings and, in turn, the speed of the motor.

As the motor speed increases the BEMF gradually blends with mutual inductance in the floating phase voltage over a range of speeds. Thus, for variable speed BLDC motors, the relative contribution of each of the BEMF and mutual inductance to the floating phase voltage may vary considerably. As disclosed herein, rather than completely transitioning from entirely reading the mutual inductance to entirely reading the BEMF the drive state control 110 converges the BEMF with the mutual inductance commutation point based on the speed of the motor, which directly relates to the BEMF produced. Thus, the drive state control 110 implements such convergence by varying the commutation threshold for the floating phase voltage measurement based on the speed of the motor.

Figure 4:
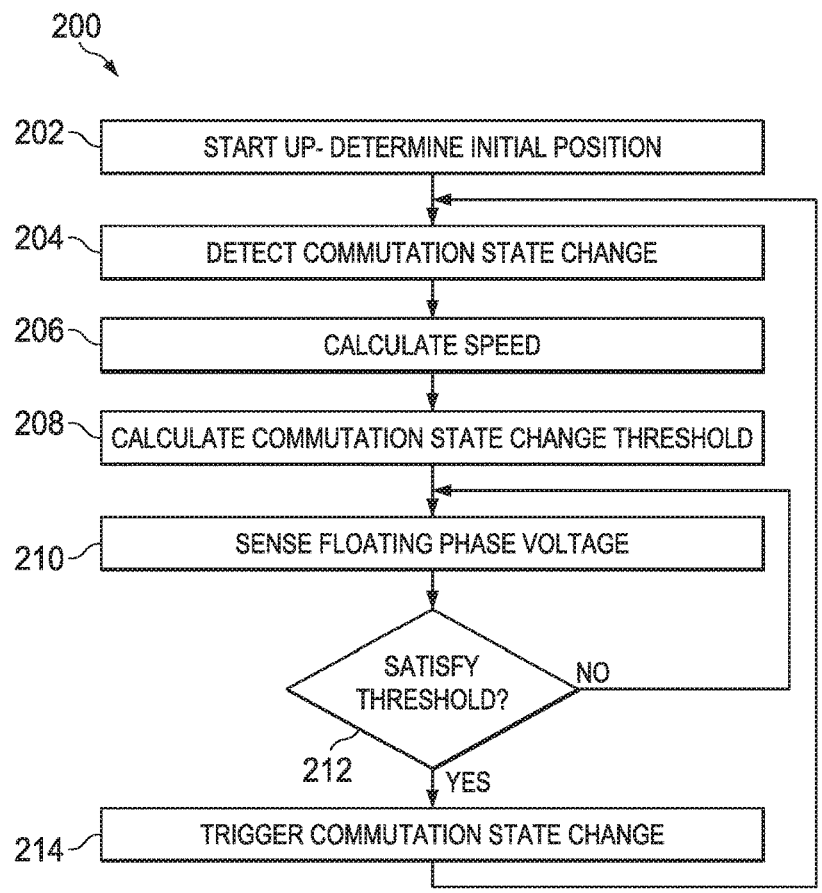
FIG. 4 is a flow diagram depicting a method to control commutation state of a motor.

FIG. 4 is a flow diagram depicting an example of a method 200 to implement drive state control, such as by commanding commutation state changes. The method begins at 202 in a start up mode in which the initial position of the motor is determined. For example, a small non-motive current (e.g., current insufficient to cause motor rotation) may be supplied to respective phase windings while voltage on a floating phase is measured to ascertain the position of the motor that is stationary or at very low speed. Based on the initial start-up position, drive control can supply current to the windings in an appropriate commutation state.

At 204, a commutation state change is detected (e.g., by detector 14). The commutation state change can be detected based on monitoring the outputs of drive control or a commutation state counter, such as disclosed herein. At 206, a speed of the motor is calculated based upon a time interval between successive state changes. For example, in response to detecting a next state change after the initial start-up commutation state, a timer can ascertain the time interval. Such time interval can be utilized (e.g., by speed calculator 18) to calculate the motor speed at 206. At 208, a commutation state change threshold is calculated. The commutation state change threshold can be determined (e.g., by threshold calculator 20) as an aggregate of the mutual inductance and BEMF voltages that a motor position corresponding to a next commutation state of the motor.

At 212, a floating phase voltage can be sensed (e.g., by sensor 32 or 50). The floating phase can be determined based on the current commutation state, for example. At 212, a determination is made (e.g., by comparator 34) whether the sensed floating phase voltage satisfies the commutation state change threshold computed at 208. If the threshold is not satisfied based on such comparison, the method returns to 210 to continually sensing the sensing of the floating phase voltage. Once the floating phase voltage reaches the threshold, the method proceeds from 212 to 214 to trigger a corresponding commutation state change command. For instance, a motor controller can change from the current commutation state to a next commutation state in response to the trigger at 214. From 214 the method returns to 204 to repeat the commutation state control loop during normal operation. If the motor stops, the method 200 may return to 202 to begin again.

In view of the foregoing, systems and methods disclosed herein adjusts for the BEMF and mutual inductance voltages based on speed, resulting in one converged commutation method across the entire speed range for a BLDC motor. Consequently, motor controls can achieve better speed torque performance (e.g., reduced torque ripple) and improved efficiency at low and intermediate speeds than other sensorless approaches. The sensorless drive control approach disclosed herein can further help reduce the cost and complexity of the resulting motor control system by eliminating sensors and associated wiring harnesses used in sensor based controls.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   a timer circuit having a state change input adapted to be coupled to a brushless direct current motor, and having an elapsed time output;
   a speed circuit having an elapsed time input coupled to the elapsed time output, and having a speed output;
   a threshold circuit having a speed input and a state threshold output, the threshold circuit including a back electromotive force calculator and a mutual inductance calculator; and
   a trigger circuit having a comparator input coupled to the state threshold output, and having a trigger output.

2. The system of claim 1, including a detector circuit having an output coupled to the state change input.

3. The system of claim 1, including:
   a sensor circuit having an input adapted to be coupled to phase windings of the brushless direct current motor, and having a sensor output; and
   a comparator circuit having an input coupled to the sensor output, an input coupled to the state threshold output, and a comparator output coupled to the comparator input.

4. The system of claim 3, in which the sensor circuit has phase winding inputs and a center tap input, the system including a selector circuit coupled to the sensor circuit to measure voltage associated with a floating phase of the motor windings.

5. The system of claim 3, including feedback circuitry coupled to the phase windings of the brushless direct current motor and having an output coupled to the sensor.

6. The system of claim 1, in which the threshold circuit is configured to calculate a back electromotive force at a next state change based on a predetermined back electromotive force parameter that varies as a function of a computed speed of the motor and whether the voltage of a floating phase is increasing or decreasing.

7. The system of claim 1, in which the threshold circuit is configured to calculate a mutual inductance for a floating phase winding of the brushless direct current motor at the next state change as a function of motor position.

8. The system of claim 1, including a motor driver to supply drive signals to the phase windings of the brushless direct current motor and having an input coupled to the trigger output.

9. The system of claim 8, in which from a stationary start-up condition of the of the brushless direct current motor, the motor driver supplying sub-motive current to one or more phases of the brushless direct current motor and measuring a motor inductance voltage in another of the phases, a starting position being determined based on the measured motor inductance voltage.

10. The system of claim 1, in which the timer circuit, the speed circuit, the threshold circuit, and the trigger circuit constitute a drive state controller implemented as machine readable instructions stored in memory.

11. The system of claim 1, including a driver controller to control current supplied to the phase windings of the brushless direct current motor current and having an input coupled to the trigger output.

12. An integrated circuit chip including the system of claim 11.

13. A brushless direct current motor system, comprising:
   a motor controller adapted to be coupled to phase windings of the brushless direct current motor, the motor controller includes:
   a drive state controller coupled to the phase windings of the brushless direct current motor, the controller providing a variable commutation threshold voltage that varies based on a speed of the brushless direct current motor, the variable commutation threshold voltage specifying a back electromotive force and mutual inductance for a floating phase of the brushless direct current motor at a next commutation state change of the brushless direct current motor, the drive state controller having a trigger output to command the next commutation state change based on a comparison of a measured voltage for the floating phase of the brushless direct current motor to the threshold voltage; and
   a driver control having a trigger input coupled to the trigger output and having an control output to control current supplied to phases of the brushless direct current motor current.

14. The motor system of claim 13 including drive circuitry having a control input coupled to the control output and having supply outputs coupled to the phase windings to supply current to the phase windings.

15. The motor system of claim 13 in which the drive state control includes:
- as a function of a computed speed of the motor and whether the voltage of the floating phase is increasing or decreasing.
- a timer circuit coupled to the phase windings to determine a time interval between successive commutation state changes of the brushless direct current motor;
- a speed circuit coupled to the timer circuit to compute the speed of the brushless direct current motor based on the time interval;
- a threshold circuit coupled to the speed calculator circuit to compute the threshold voltage based on the computed speed; and
- a trigger circuit coupled to the threshold calculator to provide the trigger based on the comparison.

16. The motor system of claim 15, including:
- feedback circuitry coupled to each of the phase windings of the brushless direct current motor to supply a voltage measurement for at least the floating phase of the brushless direct current motor;
- a phase sensor coupled to the feedback circuitry to receive the voltage measurement of the floating phase of the brushless direct current motor; and
- a comparator coupled to the phase sensor that compares the voltage measurement of the floating phase of the brushless direct current motor and the threshold voltage and provides a comparator output, the trigger providing the trigger based on the comparison.

17. The motor system of claim 15, in which the threshold calculator is configured to determine the calculation of back electromotive force at a next state change based on a predetermined back electromotive force parameter that varies.

18. A method comprising:
- detecting commutation state changes for a brushless direct current motor;
- calculating a speed of the brushless direct current motor based on a time interval between successive commutation state changes of the brushless direct current motor;
- calculating a variable threshold voltage based on the computed speed, the threshold voltage representing a back electromotive force and a mutual inductance for a floating phase winding of the brushless direct current motor at a next commutation state change; and
- comparing the threshold voltage to a measured voltage for the floating phase winding of the brushless direct current motor to determine the next commutation state change.

19. The method of claim 18, including controlling current supplied to selected windings of the brushless direct current motor based on successive commutation states.

* * * * *